United States Patent [19]

Ghahary

[11] Patent Number: 5,476,895

[45] Date of Patent: Dec. 19, 1995

[54] GRANITE-LIKE COATING

[75] Inventor: Akbar Ghahary, Ringwood, N.J.

[73] Assignee: Safas Corporation, Clifton, N.J.

[21] Appl. No.: 51,627

[22] Filed: Apr. 22, 1993

Related U.S. Application Data

[63] Continuation-in-part of Ser. No. 788,982, Nov. 7, 1991, abandoned, and a continuation-in-part of Ser. No. 882,839, May 14, 1992, Pat. No. 5,304,592.

[51] Int. Cl.⁶ ............................... C08K 3/10; C08L 33/06
[52] U.S. Cl. ........................ 524/437; 524/560; 523/171
[58] Field of Search ................................. 524/437, 560; 523/171

[56] References Cited

U.S. PATENT DOCUMENTS

| | | | |
|---|---|---|---|
| 4,643,921 | 2/1987 | Terabe et al. | 523/171 |
| 5,043,377 | 8/1991 | Nogi et al. | 524/522 |

Primary Examiner—Paul R. Michl
Assistant Examiner—LaVorda R. DeWitt
Attorney, Agent, or Firm—Lieberman & Nowak

[57] ABSTRACT

A sprayable coating composition is useful for forming a simulated granite surface having high-impact strength, superior hardness and an aesthetically-pleasing look. The coating composition has a gel coat and granules which include thermoplastic and thermoset plastic components. The gel coat and granules are visually differentiatable, substantially immiscible and substantiatly isopycnic in density. The composition, when combined with a hardener, may be sprayed into a mold and backed with fiberglass, plastic or other suitable resin to form a panel or similar structure, or may be directly applied to surfaces to provide a simulated-granite appearance.

7 Claims, No Drawings

GRANITE-LIKE COATING

BACKGROUND OF THE INVENTION

This application is a continuation-in-part of U.S. patent application Ser. No. 07/788,982, filed Nov. 7, 1991, now abandoned and U.S. patent application Ser. No. 07/882,839, filed May 14, 1992 now U.S. Pat. No. 5,304,592. The contents of both applications are herein incorporated by reference.

The present invention relates generally to a method of forming a synthetic surface material simulating various natural substances such as stone, granite and the like, and more particularly, to a method of creating and manufacturing a synthetic material capable of being sprayed onto a surface or mold which, when cured, simulates various natural substances such as granite.

Processes currently exist for forming synthetic materials and surfaces which mimic the appearance of various natural substances such as stone, marble and the like. Such materials are commonly used in the manufacture of floor and other types of tiles, countertops, sinks, architectural facings, ornamental objects, and generally for any other purpose that marble, stone or the like are used.

One example is a process utilizing a laminated sheet of material marketed under the trademark FORMICA. Such material is formed in large sheets and then cut and applied to the desired surface by adhesive or the like. Such sheets can be manufactured in solid colors or in various patterns, some of which simulate various stone or other textured material.

Another example is a process for preparing a material which is commonly referred to as "cultured marble". "Cultured marble" is formed by first creating a mold of a desired shape, spraying the internal mold surface with a gel coat and then filling the mold with a conventional casting resin. Pigments are added to the resin to give it the desired color or pattern. After the resins have set, the mold is removed with the surface facing the mold forming the outer surface of the finished product.

Although many of the prior art methods for creating synthetic surfaces simulating stone and the like are generally acceptable, there is a continuing effort to develop new and more desirable or pleasing patterns as well as patterns which more closely simulate the various natural materials such as stone, granite and the like. Accordingly, there is a continuing need and desire to improve upon existing methods.

Examples of suitable gel coatings may be found in U.S. Pat. No. 4,543,366, issued Sep. 24, 1985 to Smith, U.S. Pat. No. 5,028,459, issued Jul. 2, 1991 to Lathrop and U.S. Pat. No. 4,664,982, issued May 12, 1987 to Genovese, et al., the contents of each of which are herein incorporated by reference.

Unfortunately, known gel coats have been used together with particulates which tend to settle out of the matrix. For example, Lathrop used crushed stone aggregate having a density substantially greater than that of the gel coat. Thus, to get a three-dimensional display, multiple sequential layers of gel coat and matrix must be applied. The subject invention overcomes this problem by using particulates which are substantially isopycnic in density with the gel coat.

A similar problem was addressed in the context of cast molded granite-like artificial stone in U.S. Pat. No. 5,043,377, issued Aug. 27, 1991 to Nogi, et al. Nogi, et al. suspended cured thermoplastic chips containing a large proportion of filler within a thermoplastic matrix and stated that chips and liquid matrix should be close to each other in specific gravity.

Prior to filing the parent applications, there was no teaching to match the densities of the particulates and gel coat in a coating (brushed, sprayed, rolled, curtain walled, etc.) application.

Although not in the context of a coating, Nogi, et al. foresaw the problem of thermoplastic particulates dissolving within a thermoplastic matrix. The Nogi, et al. solution was to create particles having a very high proportion of filler (typically greater than 50% filler by weight).

The subject invention provides an alternative solution by forming particulates from a combined thermoplastic and thermoset plastic and suspending the particulates in a gel coat. Such a solution is nowhere to be found in the prior art. The advantage of using combined thermoplastic/thermoset plastic particulates is that they can be made more translucent than the Nogi, et al. chips and tend to be more compatible with the gel coat.

The subject coating is particularly useful since it can be sprayed, brushed, rolled or curtain walled directly onto a surface as a final over-spray or sprayed, or brushed rolled or curtain walled onto the inside surface of a mold and then backed with a substrate, such as fiberglass or resin.

SUMMARY OF THE INVENTION

The invention provides a composition of matter for forming a coating, such as one which simulates granite. The coating composition comprises a gel coat and granules. The granules comprise a thermoplastic and a thermoset plastic, and are visually differentiatable from the gel coat. The granules are also substantially immiscible and substantially isopycnic in density with the gel coat.

Preferably, the composition comprises a pigmented filler, and the gel coat comprises a clear resin, such as a neopentyl glycol resin. The granules may also comprise a neopentyl glycol resin as the thermoset plastic and are oftentimes about 20 microns in diameter. A preferred filler comprises aluminum, such as aluminum trihydrate.

A solid coating may be formed by contact with a hardener, which may be added to the coating composition.

A method of coating an article is provided. The method comprises preparing a coating composition comprising a gel coat and granules, and contacting the article with the coating composition. The granules comprise a thermoplastic and a thermoset plastic, and visually are differentiatable from the gel coat. The granules are also substantially immiscible and substantially isopycnic in density with the gel coat. Contacting may comprise brushing, rolling, spraying or curtain walling the coating composition onto the article. Alternatively, contacting may comprises coating a mold with the coating composition, then forming the article on the coated mold so that the article is contacted with the coating composition, then removing the coated article from the mold.

DETAILED DESCRIPTION OF THE INVENTION

The invention provides a coating which mimics the appearance of granite. Although the coating is primarily intended to be sprayed, it may also be applied by brush, roller, curtain wall, etc. The coating comprises at least two components, i.e. a gel coat and granules.

First, is the gel coat. As used herein, the term "gel coat" is to include both (i) conventional gel-like matrices which utilize a thixotropic agent and (ii) liquid-like matrices having no thixotropic agent. The use of liquid-like matrices permits curtain walling and the coating of panels. Most known gel coats are suitable for the practice of the invention, however, a clear isophthalic resin is preferred. Conventional gel coats, include, but are not limited to, polyester, neopentyl glycol (NPG) and other isophthalic resins. Such resins or resin blends are available through a variety of sources. Suitable polyester resins include those prepared from polymerizable unsaturated polyesters such as those prepared from ethylenically unsaturated polycarboxylic acids and polyhydric alcohols. Preferably the resin, when fully cured, provides desirable heat, chemical and moisture resistance. A preferred polyester resin is a styrated isophthalic resin. The resin may also incorporate neopentyl glycol (NPG); chlorinated, phosphated, or brominated compounds; or methyl methacrylate monomer. Although the preferred resin system is comprised of an isophthalic resin, an orthophthalic and other resins may also be utilized. Other possible polymeric resins include methylmethacrylate and epoxy resin systems. Further, it is possible that the primary resin could be comprised of a blend or mixture of different resin components, provided that the various resin components are compatible with one another.

The second component, the granules, are mixed into the gel coat. The term "granules" as used herein is to include the terms "chips" and "particulates" which are oftentimes referred to by those skilled in the art. Granules may be premade from the same isophthalic resin as the gel coat, or from an acrylic resin or other resin compatible with the gel coat. Granules normally have similar properties as the gel coat, e.g. resistancy, specific gravity, etc. By having similar properties, the granules remain evenly dispersed and suspended within the gel coat. It may be necessary during the formation of the granules to mix the base resin of the granules with a filler in order to obtain finished granules possessing similar properties as the gel coat. Although the granules provide a "granite-like" stone appearance, they do not significantly detract from the overall transparent characteristic of the gel coat.

The third (optional) component is pigment/filler. Typically this comprises aluminum trihydrate (ATH). Pigment/filler is added to mask the colorations of the surface to be sprayed, or in the case of a mold application, the coloration of the backing material in the mold. Although any pigmented filler having a specific gravity close to that of the granules used is acceptable, it has been found for the size granule currently preferred, i.e. about 20 microns average grain granule diameter, ATH provides the best specific gravity match and also provides a good white color. Up to 50% by weight, and preferably between about 25% and 50% by weight, of alumina trihydrate may be added to the resin. Other tinting pigments, fillers and/or other components for providing background colorant to the material and/or selected properties and characteristics to the resin system both during formation and after curing may be added. For example, titanium dioxide or other pigments can be added for additional color. Materials may be added to reduce the coefficient of thermal expansion of the cured system or to provide other desired properties. One embodiment contemplates the addition of a filler such as alumina trihydrate to improve fire retardancy.

Certain components may also be added to the resin system to control the viscosity and/or the thixotropy of the resin system or matrix.

The coating produced is generally a transparent or highly translucent coating having a sufficient amount of aluminum trihydrate therein to mask the color of the object being coated. Such coatings tend to be more stable at temperatures at which conventional gel coats break down. This increased stability may be due to thermal conductivity and thermal dissipation provided by the aluminum trihydrate.

The subject coatings generally have higher impact strength than coatings currently available on the market. In testing done to date, the subject coatings have been shown to exhibit twice the impact strength and greater hardness than currently available coatings.

The subject composition of matter is normally mixed and then sprayed through a conventional spraying apparatus in conjunction with a hardener. Such spraying mechanisms are not described here in detail, but are commonly known to those skilled in the coating art. Alternatively, the composition may be brushed, rolled, curtain walled, or applied by other means.

Compositions of the granite-like material described in the examples are as follows:

| | |
|---|---|
| 60.0% | Isophthalic NPG resin |
| 13.0% | Vinyl toluene |
| 15.0% | Styrene monomer |
| 10.0% | MMA monomer |
| 1.0% | Vinyl silane monomer & coupling agent |
| 0.5% | UV stabilizator-Thin Uvin 328 manufactured by Ciba-Geigy |
| 0.5% | Acrylic Acid |
| 100.0% | |

The specific gravity of this composition is approximately 1.1 (water is 1.0).

Resin B

Typically Resin B is unsaturated polyester or other thermoset resin (thermoplastic resins have lower heat distortion and tend to melt in solvents used in secondary processing). However, some thermoplastic resins have advantageous physical properties and performance characteristics which cannot be obtained through the use of a thermoset resin alone. For example, acrylic resins have outstanding surface hardness, superior weatherability and excellent stability to ultraviolet light. A composition using a high performance thermoplastic resin (e.g. MMA monomer) and a quality thermoset resin (e.g. NPG isophthalic) has outstaning properties such as stain resistance, hardness, good color, high melting point, uv stabilization, long term weatherability, resistance and low smoke production when ignited. A mineral filler may be added to Resin B to impart properties such as impact resistance, fire retardance, etc. and to reduce cost. Since minerals typically have a high specific gravity (approximately 1.8 –2.8), addition of such fillers will increase the specific gravity of Resin B. Accordingly, a light-weight filler, such as fumed silica or glass spheres maybe added to reduce the specific gravity of the resin.

Resin B-white (NOTE: ALL PERCENTAGES ARE WEIGHT % OF TOTAL WEIGHT)

| | |
|---|---|
| 40% | Resin (MMA/NPG) |
| 40% | Mineral filler |
| 4% | Pigment |
| 15% | Light weight filler |
| 1% | Catalyst |
| 100% | |

EXAMPLE 1

100 lbs. of Resin B-White composition was made with the following ingredients:

| | |
|---|---|
| 40 lbs. | Unsaturated polyester resin containing styrene monomer |
| 40 lbs. | Filler - aluminum trihydrate |
| 4 lbs. | Pigment - titanium dioxide |
| 15 lbs. | Light weight filler - 3M bubbles glass sulphur |
| 1 lb. | Catalyst - triganox KSM |

This composition was blended in a vacuum mixer, where air was removed. Material was then transferred to a closed metal mold and heated in an oven for one (1) hour at 300° F. Cured material was removed from the mold and crushed to not larger than ¼" diameter in a granulator. Granulated material was then transferred to pulverizing machinery to create various particle sizes ultimately for suspension in Resin A. The pulverized material was then transferred to classification machinery to segregate the various sizes and eliminate particles not retained on U.S. Mesh 140. Particles finer than U.S. Mesh 140 can increase viscosity and alter color in the final sprayable surfacing material.

Control of the classification process is important in obtaining color match, consistency between batches and distribution. Various particle sizes were blended together. A typical distribution for sprayable coating is as follows:

EXAMPLE 2

| U.S. Mesh | |
|---|---|
| 16-30 | 30% |
| 30-50 | 30% |
| 50-80 | 20% |
| 80-140 | 20% |

EXAMPLE 3

| U.S. Mesh | |
|---|---|
| 25-50 | 20% |
| 50-80 | 50% |
| 80-100 | 20% |
| 100-140 | 10% |

Pulverized material was transferred to open metal trays on a conveyor at 150° F. for three (3) hours of post-curing and evaporation of any solvent or catalyst from the cured and pulverized material.

Resin B-black

Resin B black was made with the same formulation as Resin B-white by replacing the titanium dioxide pigment with carbon black.

By following the previous procedure for Resin B-white, Resin B can be produced in a variety of colors to obtain different color combinations and designs in the finished product.

| Preparation of Sprayable Coating Material | |
|---|---|
| 60% | Resin A, an isophthalic NPG. |
| 5% | Glass bubbles used to increase viscosity of the resin from 600 cps to 2,000 cps. |
| *10% | Surface treated alumina trihydrate (ATH) with an average particle size of 15 microns used for added surface hardening properties and fire retardancy. |
| **25% | 50/50 blend of Resin B-white and Resin B-black. The composition was then gently agitated to extend the filler and create a viscosity of approximately 4,000 cps in the mix. The mix was promoted with a cobalt salt accelator. |

*A coupling agent used to treat the surface of ATH helps stability of the sprayable granite-look material against thermal shock and fading.
**Suitable for a room temperature curing system using a peroxide as hardener when spraying or brushing is to take place. This material can also be used with other catalyst systems for different curing techniques such as high temperature curing or UV curing.

Manufacturing Example 1

A prepared fiberglass mold was used to make a shower enclosure unit. Material was sprayed using 1% by weight of mix (MEK peroxide) catalyst and cured at room temperature. All horizontal and vertical surfaces of the mold were sprayed and covered with the material for a thickness of 20 mil. Material was holding against vertical surface without running because the specific gravity of the particle made of Resin B with the specific gravity of Resin A were almost the same. The sprayed material was cured in 25 minutes at 75° F. Sprayed material was backed with fiberglass reinforced polyester and cured. The fabricated piece released from the mold within 2 hours had a magnificent surface with a gray granite appearance.

Manufacturing Example 2

A pre-fabricated particle board with 1.5" bullnose shaped for a kitchen counter top with backsplash was made. The same material was sprayed over the fabricated counter top making sure to cover all the horizontal and vertical surfaces and bullnosed edge. The sprayed piece cured within 20–30 minutes at 75° F. The cured counter top had a textured finish which may be kept as sprayed. However, to simulate the texture and look of high polished natural granite, the piece was sanded to a satin finish similar in appearance to a solid surface material such as DUPONT CORIAN and then polished to obtain a glossy surface. The difference between the hardness of Resin A and Resin B replicated the natural look of granite. In addition, the specific gravity identity between Resin B and Resin A created a three-dimensional look within a clear matrix.

Manufacturing Example 3

A clear acrylic panel was prepared and vacuum formed to the shape of a bathtub. The above-described coating material was then sprayed vertically on its exterior surface. Coating on the panel was cured 25–30 minutes at 75° F. The coating adhered to the acrylic sheet permanently because the acrylic acid in the composition had chemical bonding effects with the acrylic substrate before it became a part of the cross-linking. A combination of fiberglass and resin was applied to the exterior to reinforce the tub. The interior bathtub finish looks like glass-covered granite.

Manufacturing Example 4

A baked enamel bathtub was prepared to be sprayed with the same material. All stages of sanding and polishing were performed and granite looking bathtub was created. Material bonded to the surface of the old bathtub taking advantage of the vinyl silane monomer.

Manufacturing Example 5

A U.V. curing agent was added to Resin A replacing the cobalt accelator. A conveying U.V. curing system was chosen for this experiment. A resin bath dispersed the granite-look coating over a moving per-cast polyester film (DUPONT MYLAR or ICI MELINEX). A flat surfaced article was placed on removable clear film coated with material going over a section of the conveyor that has a glass bed and U.V. light under the glass. The surface of the coated article was cured when it passed over the U.V. light. A cabinet door coated with this technique had a high gloss granite look finish because of the pre-cast film, without requiring sanding and polishing.

Manufacturing Example 6

A convection oven with heat chamber and temperature of 300° F. was chosen for this experiment. Several individual stainless steel trays (16.5"×8.5") were used to accommodate 16"×8" precasted concrete blocks. In each mold, the granite-look coating material was poured. In this experiment, a triganox KSM was picked instead of MEK peroxide to be used for the high temperature casting. The face of the block was placed onto the mold before the heating chamber of the conveyor. Passing time in the heat chamber was approximately 30 minutes. From the other side of the oven, blocks having a granite facing were produced.

Upon reading the subject application, various embodiments will become obvious to those skilled in the art. These variations are to be considered within the scope and spirit of the subject invention. Moreover, the examples and text set forth above are to be considered as representative of the subject invention, but are not to be construed as limiting. The subject application is to be only limited by the claims which follow and their equivalents.

What is claimed is:

1. A method of coating an article, which comprises
   (a) preparing a coating composition comprising a gel coat and granules, the granules comprising a thermoplastic and a thermoset plastic, the granules being visually differentiatable from the gel coat, and being substantially immiscible and substantially isopycnic in density with the gel coat; and
   (b) contacting the article with the coating composition.

2. A method of claim 1, wherein the contacting comprises brushing, rolling, spraying or curtain walling the coating composition onto the article.

3. A method of claim 1, wherein the contacting comprises coating a mold with the coating composition, then forming the article on the coated mold so that the article is contacted with the coating composition, then removing the coated article from the mold.

4. A composition of matter for forming a coating, which comprises:
   (a) a gel coat comprising a clear resin consisting of a neopentyl glycol resin; and
   (b) granules, the granules comprising a thermoplastic and a thermoset plastic, the granules being visually differentiatable from the gel coat, and being substantially immiscible and substantially isopycnic in density with the gel coat.

5. A composition of matter for forming a coating, which comprises:
   (a) a gel coat; and
   (b) granules, the granules comprising a thermoplastic and a thermoset plastic including a neopentyl glycol resin, the granules being visually differentiatable from the gel coat, and being substantially immiscible and substantially isopycnic in density with the gel coat.

6. A composition of matter for forming a coating, which comprises:
   (a) a gel coat;
   (b) granules, the granules comprising a thermoplastic and a thermoset plastic, the granules being visually differentiatable from the gel coat, and being substantially immiscible and substantially isopycnic in density with the gel coat; and
   (c) a filler comprising aluminum trihydrate.

7. A composition of matter for forming a coating, which comprises:
   (a) a gel coat;
   (b) granules, the granules comprising a thermoplastic and a thermoset plastic, the granules being visually differentiatable from the gel coat, and being substantially immiscible and substantially isopycnic in density with the gel coat;
wherein a solid coating is formed by contact with a hardener.

* * * * *